United States Patent
Senger et al.

(10) Patent No.: US 6,623,388 B1
(45) Date of Patent: Sep. 23, 2003

(54) SYSTEM FOR ADJUSTING THE VOLTAGE OF A WRAPPED COMPONENT OF AN INFINITELY VARIABLE SPEED TRANSMISSION

(75) Inventors: Karl-Heinz Senger, Loechgau (DE); Joachim Luh, Bietigheim-Bissingen (DE); Johan Luyckx, Bilzen (BE); Riné Pelters, Nuland (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/868,578

(22) PCT Filed: Dec. 15, 1999

(86) PCT No.: PCT/DE99/03987
§ 371 (c)(1),
(2), (4) Date: Aug. 8, 2001

(87) PCT Pub. No.: WO00/37832
PCT Pub. Date: Jun. 29, 2000

(30) Foreign Application Priority Data

Dec. 22, 1998 (DE) .......................................... 198 59 309
Jun. 22, 1999 (DE) .......................................... 199 28 292

(51) Int. Cl.[7] .......................... F16H 61/14; F16H 63/00; B60K 41/04
(52) U.S. Cl. ............................. 474/69; 474/18; 474/28; 477/35; 477/39
(58) Field of Search .............................. 474/28, 72, 18, 474/69; 477/39, 64, 38, 47, 169; 475/210, 66, 150, 211, 212; 180/197, 271; 188/181 C, 181 R (56) References Cited

U.S. PATENT DOCUMENTS

| | | | | |
|---|---|---|---|---|
| 3,802,528 A | * | 4/1974 | Leiber ....................... 180/197 |
| 4,467,670 A | * | 8/1984 | Kawamoto ................... 475/210 |
| 5,052,990 A | * | 10/1991 | Sakakibara et al. ......... 475/210 |
| 5,071,392 A | * | 12/1991 | Stall et al. ................... 475/150 |
| 5,188,007 A | * | 2/1993 | Hattori et al. ................. 474/28 |
| 5,211,083 A | | 5/1993 | Kato et al. |
| 5,259,272 A | | 11/1993 | Taniguchi et al. |
| 5,697,866 A | * | 12/1997 | Okahara ...................... 477/169 |
| 6,042,498 A | * | 3/2000 | Kashiwase .................... 474/18 |
| 6,080,080 A | * | 6/2000 | Bolz et al. ..................... 477/39 |

FOREIGN PATENT DOCUMENTS

| | | | |
|---|---|---|---|
| DE | 4333568 A1 | * | 4/1995 |
| DE | 196 22 108 | | 12/1997 |
| EP | 0 412 711 | | 2/1991 |
| EP | 0 451 887 | | 10/1991 |

\* cited by examiner

*Primary Examiner*—Marcus Charles
(74) *Attorney, Agent, or Firm*—Walter Ottesen (57) ABSTRACT

A system for adjusting the tension of a continuous part of a continuously variable transmissions; which is adjustable preferably with respect to its transmission ratio, the continuously variable transmission being mounted together with a vehicle engine and at least one clutch and a vehicle engine in the drive train of the vehicle, the clutch having various operating states. The essence of the invention is the adjustment of the tension at least in dependence upon the operating state of the clutch. The adjustment of the tension of the continuous part is especially advantageous when it is undertaken in dependence upon whether an adjustment of the transmission ratio of the continuously variable transmission takes place toward higher transmission ratios or to lower transmission ratios. Furthermore, the adjustment of the tension can take place in dependence upon the activation of an ABS system, ASR system and ESP system.

20 Claims, 4 Drawing Sheets

SYSTEM FOR ADJUSTING THE VOLTAGE OF A WRAPPED COMPONENT OF AN INFINITELY VARIABLE SPEED TRANSMISSION

FIELD OF THE INVENTION

The invention relates to a system for adjusting the tension of the continuous part of a continuously variable transmission.

BACKGROUND OF THE INVENTION

Such a system is, for example, known from U.S. Pat. No. 5,337,628, In addition to the continuously variable transmission, which is adjusted continuously with respect to its transmission ratio, the. following are arranged in the drive train: a vehicle engine, a torque converter which is bridgeable by a bridging clutch and clutches for the switchover between forward travel and reverse travel. This publication too relates to the adjustment of the tension of a continuous part in a continuously adjustable transmission which comprises the continuous part and drive and output conical discs. The tension of the continuous part is adjusted by the hydraulic pressure in an output-end oil chamber.

The tension of the continuous part is to be so adjusted that the efficiency of the continuously variable transmission is a maximum. It is here, on the one hand, to be prevented that the continuous part slips because of a tension which is too low and, on the other hand, the tension of the continuous part should not be too high in order to avoid high losses in the continuously variable transmission. To bring both requirements into harmony, the torque, which is transmitted from the drive end to the output end, must be known as accurately as possible. The torque at the drive disc to be transmitted is determined primarily from the torque of the vehicle engine and the torque amplification factor of a torque converter which is built in in some circumstances. A consideration of the operating states of the clutch when adjusting the tension of the continuous part does not take place. The task of the present invention is the optimization of the adaptation of the belt tension to the actual requirements.

SUMMARY OF THE INVENTION

As already mentioned, the invention proceeds from a system for adjusting the tension of a continuous part of a continuously variable transmission which is continuously adjustable preferably with respect to its transmission ratio. The continuously variable transmission is, together with a vehicle engine, mounted on at least one clutch in the drive train of the vehicle. The clutch exhibits various operating states. The essence of the invention is that the adjustment of the tension of the continuous part takes place at least in dependence upon the operating state of the clutch. In this way, a very precise adaptation of the belt tension to the actually required torque transmission is ensured.

In an advantageous configuration of the invention, it is provided that the adjustment of the tension takes place with the adjustment of a hydraulic torque. The adjustment of the hydraulic torque therefore takes place in dependence upon the operating state of the clutch. Here, it is especially provided that the continuously variable transmission has a drive end and an output end which have essentially the form df pulley discs. At least one belt (preferably a thrust element belt or a belt or a chain) is tension mounted as the continuous part between disc pairs which define the drive end and the output end. By adjusting the hydraulic pressure, the contact pressure of at least one pulley disc against the continuous part is adjusted.

In one embodiment of the invention, a clutch is provided which is driven for engaging the forward gear and the reverse gear. In this context, a forward clutch and a reverse clutch are especially considered. In addition, a torque amplifying planetary set can be mounted between the vehicle engine and the continuously variable transmission in the drive train. The planetary set is switched into the drive train when the reverse gear is engaged.

Furthermore, a torque converter can be mounted in the drive train of the vehicle and a converter bridging clutch can be provided as a clutch. The torque converter can be bridged by closing the converter bridging clutch.

The clutches assume at least the open and the closed state as operating states. Preferably, an additional operating state is present during closing of the clutches.

In an especially advantageous embodiment of the invention, it is provided that the tension of the continuous part and/or the desired contact pressure are differently computed in each case in dependence upon the actuating state of the forward and reverse clutches. Here, it is preferably provided that the tension of the continuous part is increased or reduced in response to the closing of the reverse clutch. This has the background that, when engaging the reverse gear, the torque amplifying or torque reducing planetary set is switched into the drive train whereupon the contact pressure or the tension should be increased or reduced for avoiding an impermissible slip.

In another advantageous embodiment of the invention, it is provided that the adjustment of the tension takes place in dependence upon a determined torque quantity which represents the torque acting at the input of the continuously variable transmission. The determination of this torque quantity takes place in dependence upon the operating state of the clutch.

In a further embodiment of the invention, it is provided that a slip quantity, which represents the slip of the torque converter, and an engine torque quantity, which represents the engine output torque, are determined. For an opened converter bridging clutch, the torque quantity, which represents the transmission input torque, is determined by a first determination at least in dependence upon the determined slip quantity. For a closed converter bridging clutch, the torque quantity is determined via a second determination at least in dependence upon the determined engine torque quantity. This means that the desired contact pressure, and therefore the tension of the continuous part, is computed in dependence upon the actuating state of the converter bridging clutch.

For an open converter bridging clutch, the primary torque, that is, the transmission input torque, is computed from the engine rpm and the turbine rpm in correspondence to the physical equations of the torque converter. This computation method is more precise because the load signal, which is available from the vehicle engine, often contains large inaccuracies, for example, because of ancillary equipment not detected and because of friction in the vehicle engine. In systems, which use the engine torque directly for tension control, these inaccuracies lead to increased inaccuracies in the computation of the contact pressure or the tension (especially at standstill of the vehicle, that is, for high amplification of the torque converter). The contact pressure or the tension is, for this reason, too high in such systems when bringing the vehicle into motion from standstill whereby unnecessarily high power is converted in the transmission.

For a closed converter bridging clutch, the primary torque (that is, the transmission input torque) is computed from the engine characteristic field, corrected by the inertial torque of the engine and the torque take-up of the pump.

During closing of the converter bridging clutch, it is especially advantageous to select, as the torque quantity, the maximum value from the above-mentioned first and second determination. This means that, when closing the converter bridging clutch, a switchover is made smoothly between the two computing methods for the primary torque in that the larger computed primary torque is used.

In a further advantageous embodiment of the invention, it is provided that, during the closing of the clutches, the tension of the continuous part, and therefore the contact pressure, is increased compared to the tension or compared to the contact n pressure in the previous operating state. In this embodiment of the invention wherein the contact pressure or the tension is increased during the switching in of the clutches, possible torque impacts can be kept away from the continuous part. This can happen when switching in the forward or reverse clutches or when closing the converter bridging clutch.

In a further advantageous embodiment of the invention, it is provided that the adjustment of the tension of the continuous part takes place hydraulically and a hydraulic pump is provided which is driven by the vehicle engine. The engine torque quantity, which represents the engine output torque, is, in this embodiment, determined in dependence upon a pressure quantity representing the operating state of the pump. This means that, when computing the primary torque (especially for a closed converter clutch), the torque, which is taken up by the hydraulic pump, is considered.

The adjustment of the tension of the continuous part can furthermore take place in dependence upon whether an adjustment of the transmission ratio of the continuously variable transmission takes place toward larger or smaller ratios. Here, it is especially provided that the tension or the contact pressure during an adjustment to higher transmission ratios is increased compared to the adjustment of a transmission ratio which is essentially constant. In this way, it is possible in an advantageous manner to achieve more rapid transmission ratio adjustments to larger transmission ratios and to avoid belt slippage because of a primary pressure which is too low.

In a further advantageous embodiment, it is provided that the vehicle has an anti-blocking control system and/or a drive slip control system and/or a directional stability control system. The braking forces, which act on the wheels of the vehicle, are modified by means of these control systems in the active state thereof. The adjustment of the tension of the continuous part or the adjustment of the contact pressure takes place in this embodiment of the invention also in dependence upon the activation of such a control system. For the activation of such control systems, it is especially provided that the contact pressure and therefore the tension is increased in order to protect the continuous part against large torque impacts.

BRIEF DESCRIPTION OF THE DRAWINGS

The invention will now be described with reference to the drawings wherein:

FIG. 2 shows an embodiment of the system of the invention with respect to a block circuit diagram; whereas.

DESCRIPTION OF THE PREFERRED EMBODIMENTS OF THE INVENTION

The invention will now be explained in greater detail with respect to the embodiments described hereinafter.

Figure 1:
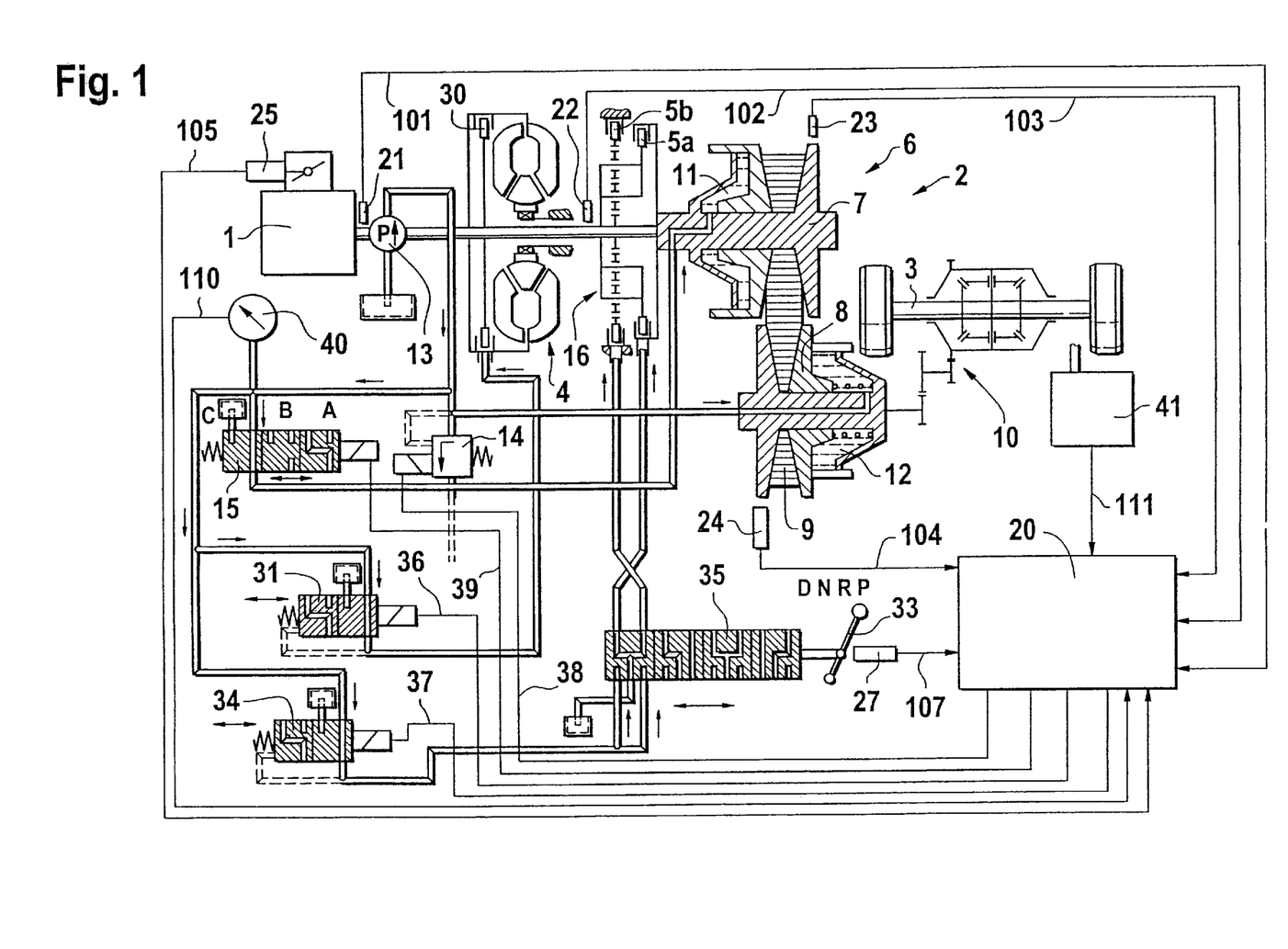
FIG. 1 schematically shows an overview of the drive train of the vehicle.

FIG. 1 shows a continuously variable transmission 2 in a motor vehicle for transmitting force from a vehicle engine 1 to the drive shafts 3 of the wheels. The drive train of the vehicle includes a torque converter 4 having a converter bridging clutch 30 and clutches 5a and 5b for switching over between forward travel and reverse travel with the planetary gear set 16. The planetary gear set 16 is mounted between the engine 1 and the variator 6. The variator 6 comprises a drive conical disc pulley set 7 (primary end) and an output conical disc pulley set 8 (secondary end). The force from the drive conical disc pulley set 7 is transmitted to the output conical disc pulley set 8 with the aid of a chain or a thrust element belt 9 (continuous part).

Each conical disc pulley set comprises an axially fixed and an axially movable disc. With a targeted variation of the axially movable discs on the drive conical disc pulley set 7 and the output conical disc pulley set 8, the transmission ratio of the variator 6 changes from a high start-drive transmission ratio "low" to a low transmission ratio "overdrive".

The output conical disc pulley set 8 is connected to the drive shafts 3 of the wheels via a compensating gear 10.

The axially movable conical pulley discs 7 and 8 are hydraulically adjustable and have oil chambers 11 and 12 for this purpose. For the pressure oil supply, the transmission 2 includes an oil pump 13 which runs, for example, at the rpm of the internal combustion engine 1.

Furthermore, the vehicle has an anti-blocking system and/or a drive-slip control system and/or a directional stability system 41 which can so change the braking force at the wheel that a blocking or slippage of the wheels is prevented or the directional stability of the vehicle is increased.

In the embodiment shown in FIG. 1, the pressure in the output end oil chamber 12 is adjusted with the aid of a directly controlled pressure limiting valve 14. For this purpose, the control apparatus 20 supplies an actuating signal 38 to the valve 14. The transmission ratio of the variator 6 is changed with the aid of a directly controlled proportional valve 15 in that the control apparatus 20 pregives the actuating quantity 39.

For actuating the clutches 5a and 5b, the position of the manual shift valve 35 is changed with the aid of the selection lever 33. This hand shift valve 35 includes the position P (park position), R (reverse driving position), N (neutral position) and D (normal position or forward drive position). The contact pressure of the clutches 5a and 5b can be adjusted with the aid of this directly controlled pressure limiting valve 34. For this purpose, the control apparatus 20 supplies the actuating signal 37. The directly controlled pressure limiting valve 31 functions to close the converter b ridging clutch 30. The actuating signal 36 is pregiven by the control apparatus 20 to close the converter bridging clutch 30.

The precise configuration of the electrically actuable valves is shown only symbolically in FIG. 1 and can be configured differently than shown in FIG. 1, for example, with precontrol valves and primary stages.

The sensors 21, 22, 23, 24, 25, 27 and 40 are connected to the control apparatus 20. A sensor 21 is provided for determining the engine rpm signal 101. The sensor 22 supplies a signal 102 which represents the output rpm, that is, the driven rpm of the torque converter, the turbine rpm. The sensor 23 supplies the primary rpm signal 103 and the sensor 24 provides the secondary rpm signal 104. Furthermore, the sensor 25 is present for determining a load signal 105 of the engine 1. The sensor 27 supplies the selection lever position signal 107. The pressure sensor 40 measures the pressure in the driven end oil chamber 12 and supplies the pressure signal 110.

Furthermore, the anti-blocking system or the drive-slip control system (ABS or ABS/ASR system) 41 supplies a signal 111 which indicates whether the ABS system or the ABS/ASR system or the directional stability system (ESP) is active. These systems are, for example, active when a blocking of the wheels is prevented or a slippage of the wheels is prevented via an active intervention of the ASR or when the directional stability is increased and a loss of the control of the vehicle is prevented by an active intervention of the ESP, for example, via a wheel-individual underbraking or overbraking of individual wheels.

Figure 2:
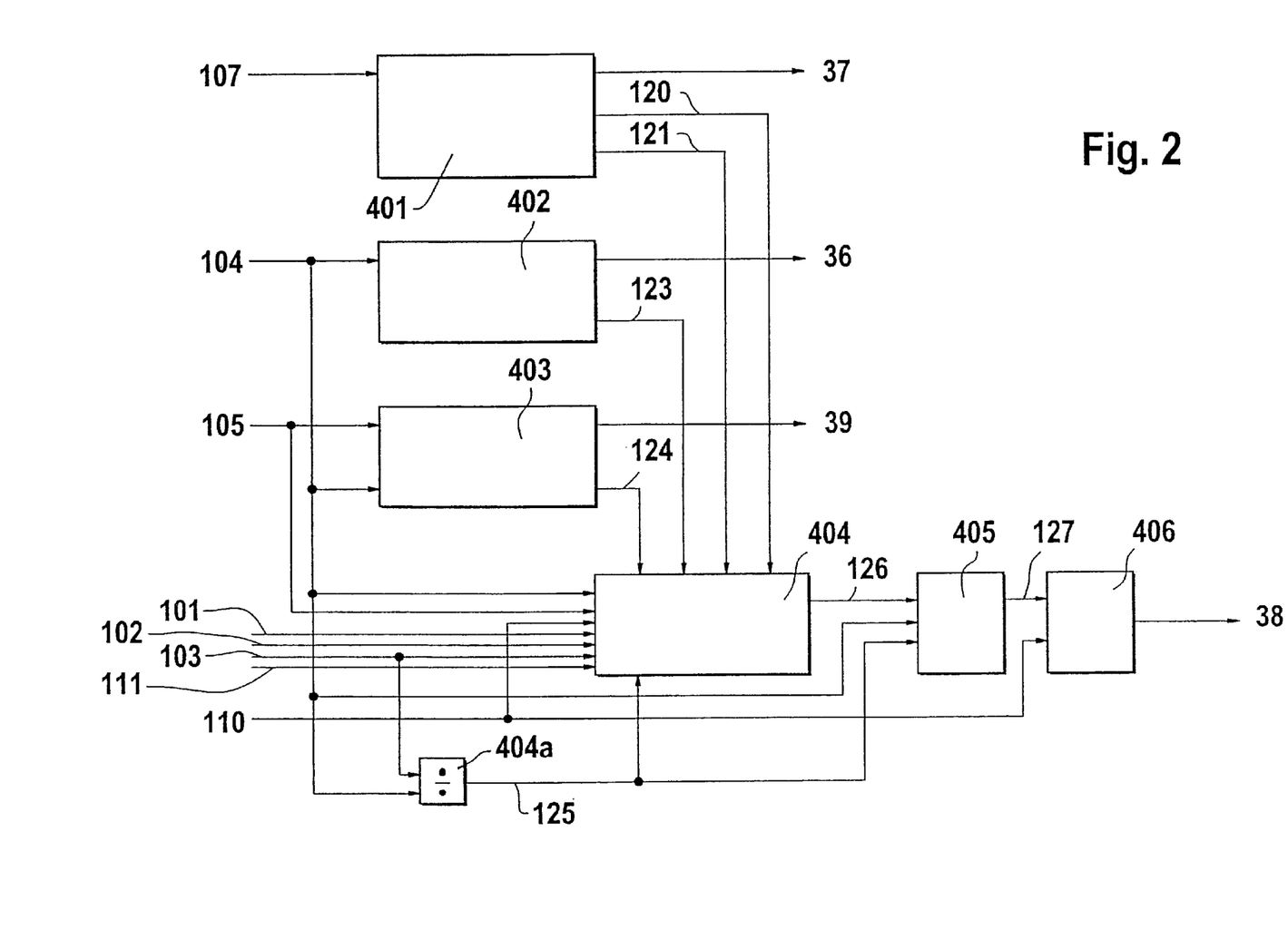

FIG. 2 shows a block circuit diagram of all control algorithms which are realized in the control apparatus 20. These control algorithms coact for the adjustment of the contact pressure in the secondary oil chamber 12.

The computation unit 401 functions to control the forward clutch 5a and the reverse clutch 5b. The computation block 401 computes the actuating signal 37 for driving the valve 34. For this purpose, at least the position signal 107 of the selection lever 27 is processed in block 401. The block 401 generates two status signals 120 and 121 which reflect the state of the forward clutch 5a and/or the reverse clutch 5b. If the status signal 120 for the forward clutch 5a has, for example, the value 1, then this means that the forward clutch 5a is open. If the status signal 120 has the value 2, then this means that the forward clutch 5a closes. If. the status signal 120 has the value 3, then this means that the forward clutch 5a is closed. The same applies for the status signal 121 of the reverse clutch 5b.

The computation unit 402 supplies the actuating signal 36 of the converter bridging clutch 30. For this purpose, at least the secondary rpm signal 104 is evaluated. The block 402 computes the status signal 123 which characterizes the state of the converter bridging clutch 30. The description of the states for the status signal 120 of the forward clutch 5a applies in the same manner for the status signal 123 of the converter bridging clutch 30.

The computation unit 403 supplies the actuating signal 39 for adjusting the transmission ratio of the variator 6. For this purpose, at least the load signal 105 of the engine 1 and the secondary rpm signal 104 are processed. The block 403 computes the desired primary rpm signal 124 as an intermediate quantity. Alternatively, the signal 124 can also be a desired engine rpm signal.

The computation unit 404a computes the transmission ratio signal 125 as a quotient from the primary rpm signal 103 and the secondary rpm signal 104.

The computation unit 404 forms the primary rpm signal 126. The contact pressure in the secondary oil chamber is adjusted on the basis of the primary torque signal 126. The computation unit 405 determines the desired pressure signal 127 for the contact pressure in the secondary oil chamber 12 from the primary torque signal 126.

The computation unit 406 includes a PID control algorithm with which the actuating signal 38 is formed by comparing the desired pressure signal 127 and the actual pressure signal 110. The actuating signal 38 leads, with the aid of valve 14, to the adjustment of the desired contact pressure,in the secondary oil chamber 12.

Figure 3:
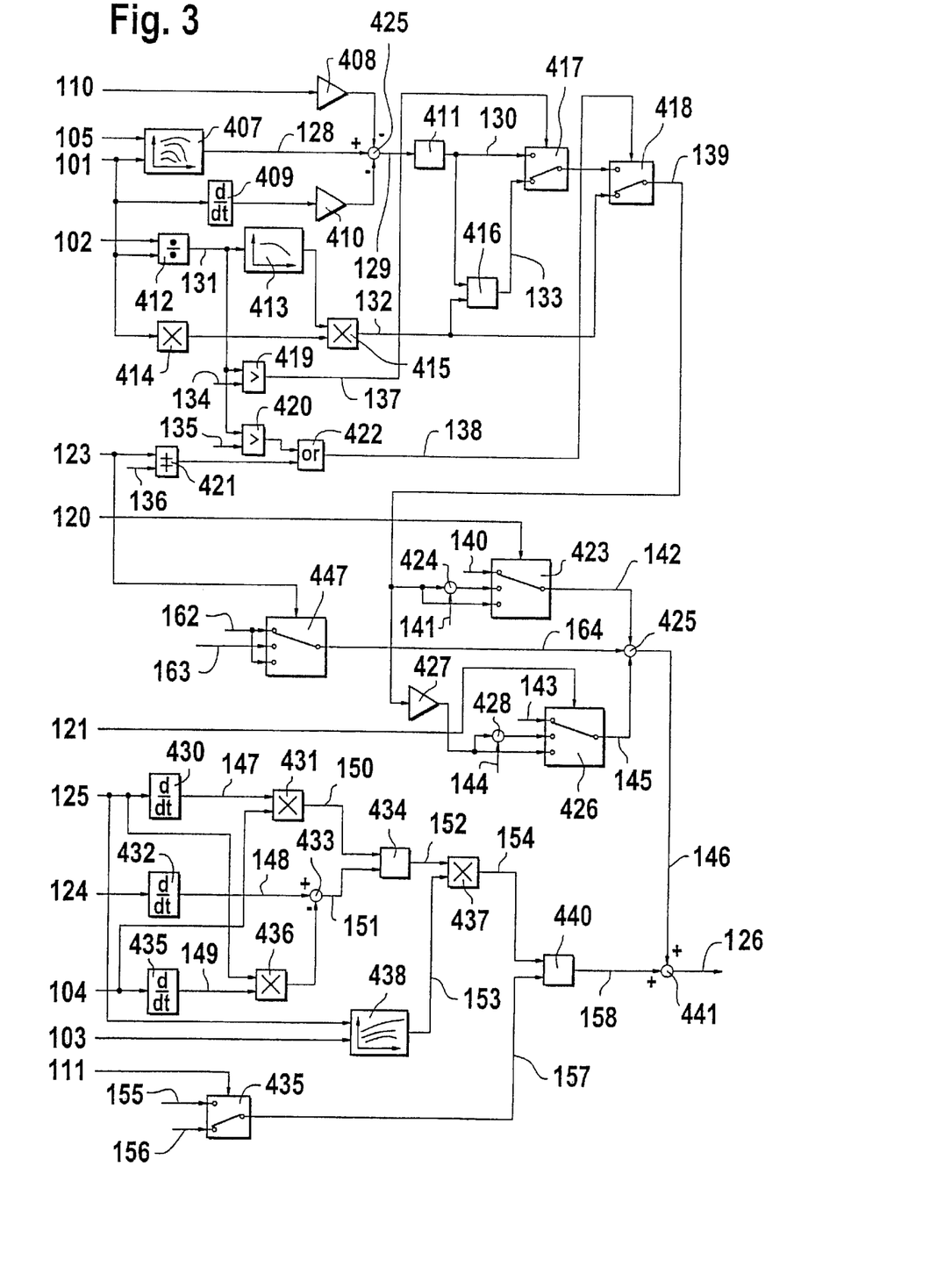
FIGS. 3 and 4 show a more detailed configuration of individual blocks of FIG. 2 based on block circuit diagrams.

The block circuit diagram of the computation unit 404 is shown in FIG. 3. The steady-state engine rpm signal 128 is computed with the characteristic field block 407 from the load signal 105 of the engine 1 and the engine rpm signal 101. The dynamic engine torque signal 129 results from the steady-state engine torque signal 128 less the torque signal of the pump, which is formed by multiplication 408 of the measured actual pressure signal 110 by a constant, less the product 410 of the gradient of the engine rpm signal 101 and a constant representing the inertial torque of the engine 1.

The block 411 supplies the signal 130. This is the amount of the dynamic engine torque signal 129.

The computation block 412 computes the rpm ratio signal 131 from the turbine rpm signal 102 and the engine rpm signal 101. The characteristic line block 413 computes from the rpm ratio 131 a characteristic number which is multiplied by the square of the engine rpm signal 101. The result is the torque signal 132 of the torque converter 4 for an open converter.bridging clutch 30.

The block 419 compares the rpm ratio signal 131 to a constant 134. The resulting binary signal 137 is logically true when the rpm ratio 131 is greater than the constant 134. Otherwise, the signal 137 is logically false.

The block 420 compares the rpm ratio signal 131 to a constant 135 in the same way as block 419. The block 421 likewise supplies a logical output signal. The output has the value "logically true" when the state signal 123 of the bridging clutch does not assume the value 136. The value 136 is set to 1. This means that, when the status signal 123 of the converter bridging clutch does not have the state "clutch open", the output of the block 421 is logically true, otherwise, it becomes logically false. An OR block 422 is connected downstream of the blocks 420 and 421. The OR block 422 supplies a logic signal 138. This logic signal is logically true when the rpm ratio 131 at the converter is greater than the value 135 or when the status signal 123 of the converter bridging clutch 30 does not indicate the state "clutch open".

A selection is made with the switching blocks 417 and 418 as to which value the converter driven torque signal 139 is set. When the signal 138 has the value "logically false", then the signal 139 is set to the value of the signal 132. When the signal 138 has the value "logically true" and the signal 137 has the value "logically true", then the signal 139 is set to the value of the signal 130. Otherwise, the signal 139 is set to the value of the larger of the two signals 130 and 132. The block 416 is present for selecting the larger signal. The switching block 423 supplies the primary torque signal 142 for an actuated forward clutch 5a. The state of the status signal 120 of the forward clutch 5a determines the height of the signal 142. If the status signal 120 has the value 1, then the signal 142 is set to the value of the constant 140 (equal to 0). If the status signal 120 has the value 2, that is the clutch 5a is closing, then the signal 142 is set to the value of the sum of the signal 139 and a constant 141. In this way, the contact pressure in the secondary oil chamber is increased for a short time when the forward clutch 5a is closed in order to counter a slippage of the thrust element belt 9 by torque impacts when closing the clutch. If the status signal 120 has the value 3, then the signal 142 is set to the value of the signal 139.

The switch block 426 supplies the primary torque signal 145 when the reverse clutch 5b is actuated. The state of the status signal 121 of the reverse clutch 5b then determines the height of the signal 145. If the status signal 121 has the value 1, then the signal 145 is set to the value of the constant 143

(equal to 0). When closing or for a closed reverse clutch 5b, the torque amplification of the planetary set 16 is to be considered when driving in reverse. The amplification factor in block 427 serves this purpose.

If the status signal 121 has the value 2 (that is, the clutch is closing), then the signal 145 is set to the value of the sum of the result of the block 427 and a constant 144. In this way, the contact pressure in the secondary oil chamber is increased for a short time when closing the reverse clutch 5b in order to counter a slippage of the thrust element belt 9 because of torque impacts when closing the clutch. If the status signal 121 has the value 3, then the signal 145 is set to the value of the result from block 427.

The signal 164 effects a short-time increase of the contact pressure in the secondary oil chamber 12 when closing the converter bridging clutch 30. In this way, the thrust element belt 9 is protected against torque impacts when closing the converter bridging clutch 30. The torque impacts could otherwise lead to a slippage of the belt 9. When the status signal 123 of the converter bridging clutch 30 has the value 2, then the signal 164 is set to the value of the constant 163; otherwise, the signal 164 is set to the value of the constant 162 (equal to 0).

The summation position 425 adds the signals 142, 145 and 164 to the quasi steady-state primary torque signal 146.

The block 430 forms the gradient 147 of the transmission ratio signal 125. In block 431, the gradient 147 is multiplied by the secondary rpm signal 104. The result is a first signal 150 for the dynamic pressure increase in the secondary oil chamber 12. The block 432 supplies the gradient 148 of the desired primary rpm 124. The block 435 forms the gradient 149 of the secondary rpm signal 104. The block 436 multiplies the gradient 149 by the transmission ratio signal 125. The product is subtracted from the signal 148. The result is a second signal 151 for the dynamic pressure increase in the secondary oil chamber 12. The signal 151 supplies data as to the probable transmission ratio adjustment of the variator 6 based on. the desired transmission ratio adjustment according to the, computation unit 403. In contrast, the signal 150 supplies data as to the actually realized transmission ratio adjustment of the variator 6 based on the measured rpm traces at the variator 6. With the block 434, the larger of the signals 150 and 151 is selected and is multiplied in block 437 by a characteristic number 153. The result is the signal 154. The characteristic. number 153 is determined with the characteristic field block 438 in dependence upon the transmission ratio signal 125 and the primary rpm signal 103.

For an active ABS system or an active ABS/ASR system or directional stability system ESP, the contact pressure in the secondary oil chamber 12 is increased with the switching block 439. This means that the contact pressure is increased when the start of a blocking of the wheels or a slippage of the wheels or a break-away of the vehicle is detected. When the signal 111 from the ABS system or the ABS/ASR system or ESP system is logically true, then the signal 157 is set to the value of the constant 155; otherwise, the signal 157 is set to the constant 156 (equal to 0).

With the block 440, the larger of the signals 154 and 157 is selected and assigned to the dynamic primary torque signal 158. The summation position 441 adds the quasi steady-state primary torque signal 146 and the dynamic primary torque signal 158 to the primary torque signal 126.

Figure 4:
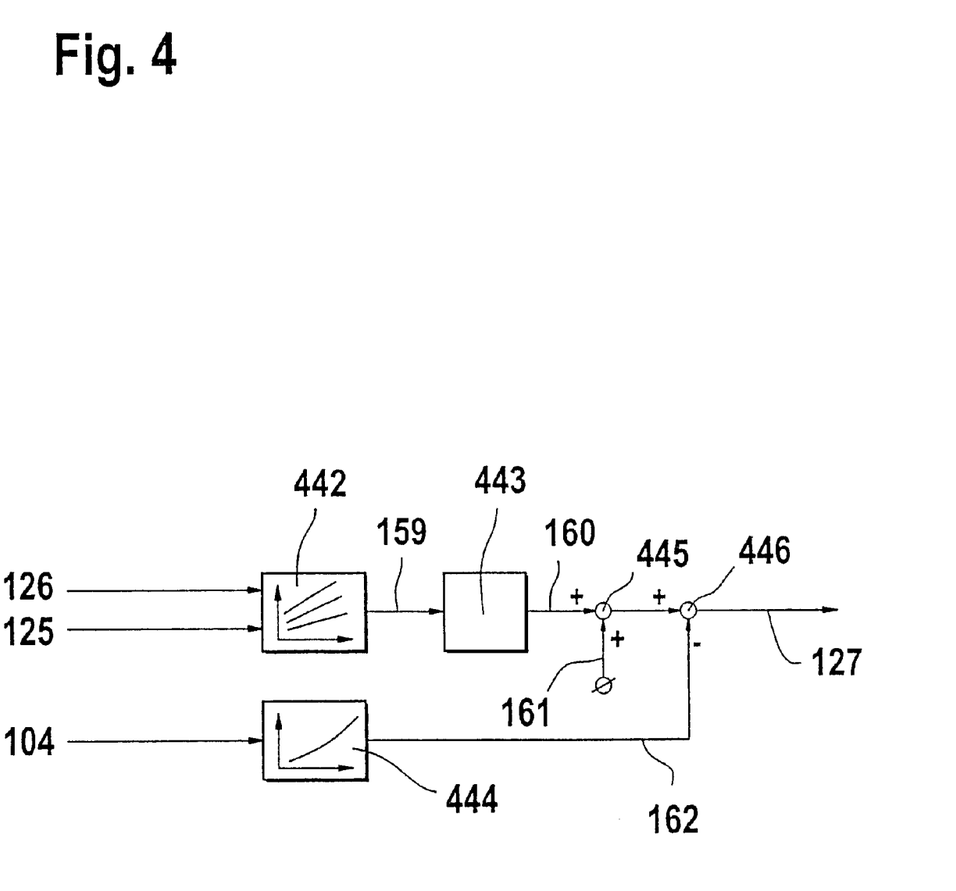

In FIG. 4, the computation of the desired pressure signal 127 is shown. In the characteristic field block 442, the signal 159 is obtained from the primary torque signal 126 and the transmission ratio signal 125. This signal is filtered in the attenuation block 443. The intensity of the filtering can be differently adjusted with increasing and falling flanks. A constant 161 is added in the summation position 445. This constant defines a reserve for the contact pressure in the secondary oil chamber 12. From the result, a value, which is dependent upon the secondary rpm signal 104, is subtracted at the summation position 446. This value is from the characteristic line block 444. As a result, one obtains the desired pressure signal 127 for the contact pressure in the secondary oil chamber 12.

In summary, it can be said that the following differences are especially to be emphasized in contrast to the computation of the contact pressure in accordance with the state of the art.

1. The desired contact pressure is computed differently in dependence upon the actuating state of the forward and reverse clutches. In contrast thereto, the state of the art does not distinguish the actuating state of the clutches. Especially in the reverse gear, the transmission ratio of the planetary set is considered in the present invention.

2. The desired contact pressure is computed in dependence upon the actuating state of the converter bridging clutch 30. For an open converter clutch, the primary torque is computed in correspondence to the physical equations of the torque converter from the engine rpm and the turbine rpm. This computation method is more accurate because the load signal, which is available from the engine, often contains large inaccuracies, for example, because of non-detected ancillary equipment and friction in the engine. In computation methods in accordance with the state of the art, these inaccuracies lead to increased inaccuracies in the computation of the contact pressure, especially for standstill of the vehicle, that is, for high amplification of the torque converter. This contact pressure is therefore too high during start-drive from standstill whereby an unnecessarily high power is converted in the transmission. For a closed converter clutch, the primary torque is computed from the engine characteristic field, corrected by the inertial torque of the engine and by the torque take-up of the hydraulic pump.

For a converter bridging clutch which is closing, the primary torque is smoothly switched between the two computation methods in that the larger computed primary torque is used.

3. During switching in the clutches, the contact pressure is increased in order to keep possible torque impacts away from the belt.

4. During closing of the converter bridging clutch, the contact pressure is increased in order to keep possible torque impacts away from the belt.

5. The torque, which is taken up by the pump, is considered in the computation of the primary torque when the converter clutch is closed.

6. The contact pressure is increased when transmission ratio adjustments are made to larger transmission ratios in order to obtain a more rapid transmission ratio adjustment and to avoid belt slippage because of a primary pressure which is too low.

7. The contact pressure is increased when the ABS and ASR and ESP are active in order to protect the belt from large torque impacts.

What is claimed is:

1. A system for adjusting the tension of a continuous part of a continuously variable transmission of a vehicle, the system comprising:

a drive train including a vehicle motor and said continuously variable transmission;

said drive train further including at least one clutch having various operating states;
means for driving said clutch to engage a forward and a reverse gear; and,
means for adjusting said tension in dependence upon the operating state of said clutch.

2. The system of claim 1, further comprising a torque reducing planetary set mounted between said vehicle motor and said continuously variable transmission; and, means for switching aid torque reducing planetary set into said drive train when the reverse gear is engaged.

3. The system of claim 1, further comprising torque amplifier mounted between said vehicle motor and said continuously variable transmission; and, means for switching said torque amplifier into said drive train when the reverse gear is engaged.

4. The system of claim 1, wherein said clutch is configured as a forward clutch and a reverse clutch; and, wherein said system further comprises means for increasing or reducing the tension of said continuous part in response to a closing of said reverse clutch.

5. The system of claim 1, wherein the adjusting of the tension of said continuous part is further dependent upon an adjustment of the transmission ratio of said continuously variable transmission toward higher; and, said tension is increased during an adjustment to higher transmission ratios compared to the adjustment of an essentially constant transmission ratio.

6. The system of claim 1, wherein the vehicle includes at least one of the following control systems: an anti-blocking control system, an anti-slip control system and a directional stability control system; a braking force on the wheels of the vehicle can be modified with said at least one of said control systems during the active state thereof; and, the adjustment of the tension of said continuous part continues to take place in dependence upon the activation of said at least one of said control systems.

7. The system of claim 1, further comprising:
said continuously variable transmission having a drive end and an output end;
said drive end and said output end being defined by first and second conical disc pairs defining respective pulleys for accommodating said continuous part;
said continuous part being tension mounted between said first and second conical disc pairs;
hydraulic means for developing a hydraulic pressure to impart hydraulic forces to at least one of the conical discs of said first and second conical disc pairs;
said means for adjusting said tension including means for adjusting said hydraulic pressure and the adjustment of said hydraulic pressure being dependent upon the operating state of said clutch; and,
said adjusting means being adjusted to adjust the contact pressure of said one conical disc against said continuous part.

8. The system of claim 7 wherein said continuous part is selected from the group consisting of thrust element belt, a V-belt and a chain.

9. The system of claim 1, further comprising a plurality of said clutches which assume the open and closed state as operating states; and, said clutches assuming a further operating state during the closing of said clutches.

10. The system of claim 9, further comprising means for increasing the tension of said continuous part during the closing of said clutches relative to the tension thereof in the operating state of said clutches before said closing of said clutches.

11. A system for adjusting the tension of a continuous part of a continuously variable transmission, the system comprising:
a drive train including a vehicle motor and said continuously variable transmission;
said drive train further including a torque converter and a converter bridging clutch;
said converter bridging clutch being switchable between a closed position wherein said torque converter is bridged and an open position;
means for determining a slip quantity representing the slip of said torque converter;
means for determining a first torque quantity representing the output torque of said vehicle motor;
means for making determinations of a second torque quantity representing the torque acting at the input of said continuously variable transmission as follows:
(a) in a first determination, when said converter bridging clutch is in said open position, and at least in dependence upon said slip quantity; and,
(b) in a second determination, when said converter clutch is in said closed position, and in dependence upon said first torque quantity; and,
means for adjusting said tension in dependence upon the operating state of said clutch and in dependence upon said second torque quantity.

12. The system of claim 11, wherein one of said clutches is configured as a forward clutch and a reverse clutch; and, wherein said system further comprises means for increasing or reducing the tension of said continuous part in response to a closing of said reverse clutch.

13. The system of claim 11, wherein a maximum value is selected as said second torque quantity from said first and second determinations while said converter bridging clutch is closing.

14. The system of claim 11, further comprising:
hydraulic means for hydraulically adjusting said tension of said continuous part;
a hydraulic pump driven by said vehicle motor; and,
means for causing said determination of said second torque quantity to take place in dependence upon a pressure quantity representing the operating state of said pump.

15. The system of claim 11, wherein the adjusting of the tension of said continuous part is further dependent upon an adjustment of the transmission ratio of said continuously variable transmission toward higher; and, said tension is increased during an adjustment to higher transmission ratios compared to the adjustment of an essentially constant transmission ratio.

16. The system of claim 11, wherein the vehicle includes at least one of the following control systems: an anti-blocking control system, an anti-slip control system and a directional stability control system; a braking force on the wheels of the vehicle can be modified with said at least one of said control systems during the active state thereof; and, the adjustment of the tension of said continuous part continues to take place in dependence upon the activation of said at least one of said control systems.

17. The system of claim 11, further comprising:

said continuously variable transmission having a drive end and an output end;

said drive end and said output end being defined by first and second conical disc pairs defining respective pulleys for accommodating said continuous part;

said continuous part being tension mounted between said first and second conical disc pairs;

hydraulic means for developing a hydraulic pressure to impart hydraulic forces to at least one of the conical discs of said first and second conical disc pairs;

means for adjusting said tension by adjusting said hydraulic pressure at the adjustment of said hydraulic pressure being dependent upon the operating state of said clutch; and, said adjusting means being adjusted to adjust the contact pressure of said one conical disc against said continuous part.

18. The system of claim 17, wherein said continuous part is selected from the group consisting of a thrust element belt, a V-belt and a chain.

19. The system of claim 11, further comprising a plurality of said clutches which assume the open and closed state as operating states; and, said clutches assuming a further operating state during the closing of said clutches.

20. The system of claim 19, further comprising means for increasing the tension of said continuous part during the closing of said clutches relative to the tension thereof in the operating state of said clutches before said closing of said clutches.

* * * * *

UNITED STATES PATENT AND TRADEMARK OFFICE
CERTIFICATE OF CORRECTION

| | | |
|---|---|---|
| PATENT NO. | : 6,623,388 B1 | Page 1 of 1 |
| DATED | : September 23, 2003 | |
| INVENTOR(S) | : Karl-Heinz Senger et al. | |

It is certified that error appears in the above-identified patent and that said Letters Patent is hereby corrected as shown below:

<u>Title page,</u>
Item [57], ABSTRACT,
Line 2, delete "transmissions;" and substitute -- transmission, -- therefor.

<u>Column 9,</u>
Line 10, delete "aid" and substitute -- said -- therefor.
Line 12, delete "comprising torque" and substitute -- comprising a torque -- therefor.
Line 25, insert -- transmission ratio -- between "higher" and ";".
Line 56, delete "7" and insert -- 7, -- therefor.
Line 57, insert -- a -- between "of" and "thrust".

<u>Column 10,</u>
Line 54, insert -- transmission ratio -- between "higher" and ";".

<u>Column 11,</u>
Line 14, delete "at" and substitute -- and -- therefor.

Signed and Sealed this

Twenty-third Day of December, 2003

JAMES E. ROGAN
*Director of the United States Patent and Trademark Office*